Dec. 18, 1956  F. R. PUTNAM  2,774,208
COTTON PICKER

Filed June 8, 1953  2 Sheets-Sheet 1

FRANK R. PUTNAM
INVENTOR.

BY *Herbert J. Brown*
ATTORNEY

Dec. 18, 1956  F. R. PUTNAM  2,774,208
COTTON PICKER

Filed June 8, 1953  2 Sheets-Sheet 2

FRANK R. PUTNAM
INVENTOR.

BY *Herbert J. Brown*

ATTORNEY

2,774,208

COTTON PICKER

Frank R. Putnam, Odessa, Tex.

Application June 8, 1953, Serial No. 360,144

4 Claims. (Cl. 56—48)

This invention relates to harvesting machines, and has particular reference to a cotton picker of the type which moves along the rows of plants and mechanically removes the cotton fibers from the bolls.

The principal object of the invention is to provide an efficient and relatively inexpensive construction for picking cotton.

A particular object of the invention is to provide a cotton picker of the described class wherein the doffing cylinders also serve as fans or blowers for moving the picked cotton to a collecting compartment or the like.

Another object of the invention is to provide an improved picker and doffer arrangement whereby clogging of the cotton in the doffer is effectively eliminated.

A further object of the invention is to provide a cotton picker capable of harvesting practically all of a first growth, yet one which will not materially injure the up-opened bolls, thus providing for the harvesting of subsequent growths.

These and other objects will become apparent from the following description and the accompanying drawings, wherein.

Figure 1:
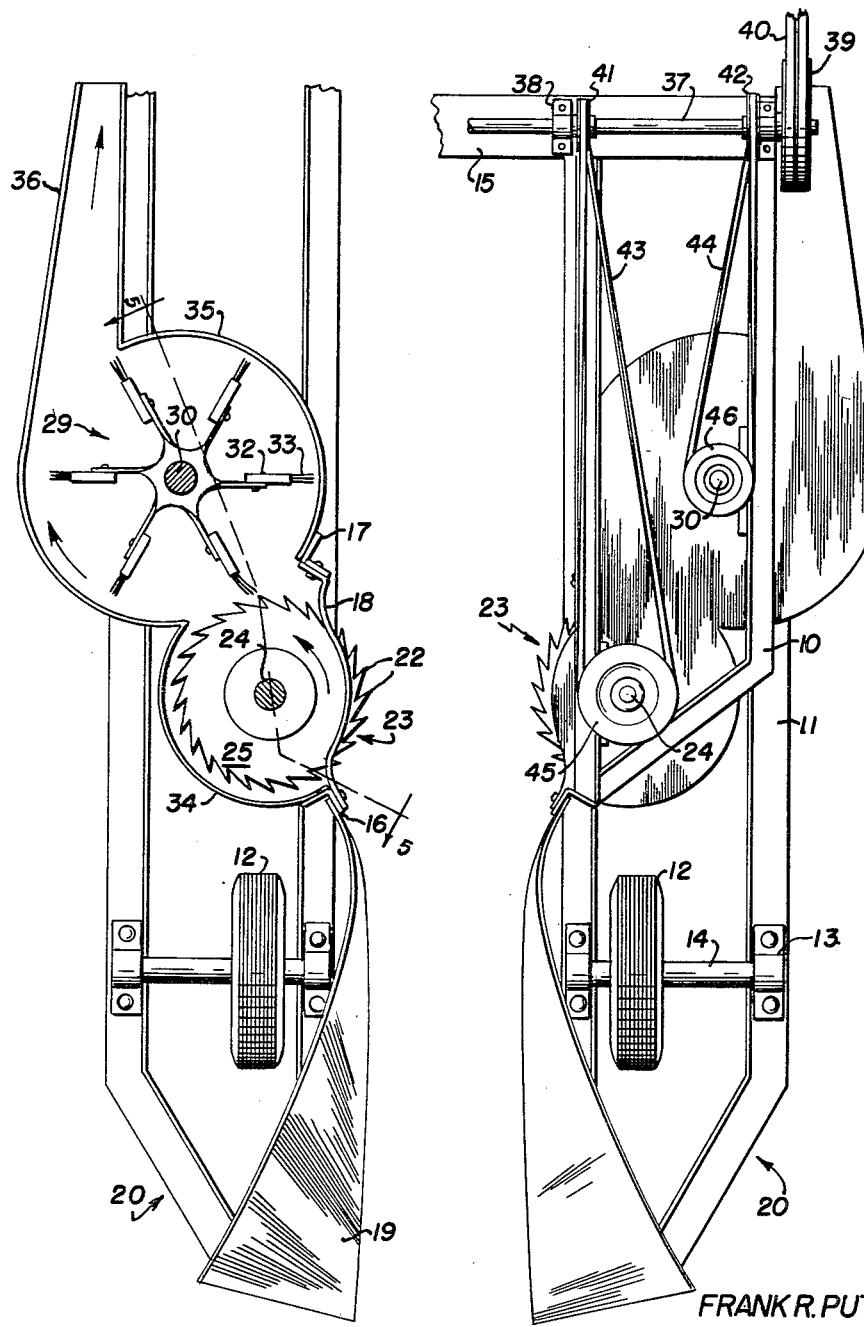
Figure 1 is a view with parts omitted of a cotton picker embodying the features of the present invention.
Figure 3:
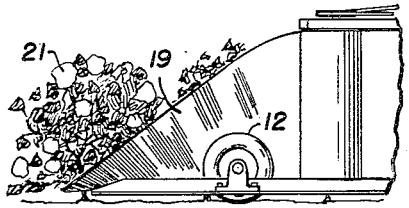
Figure 3 is a side elevational view on a reduced scale of the forward end of the present cotton picker.
Figure 6:
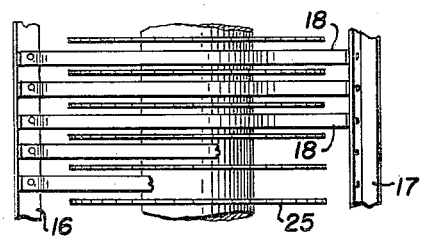
Figure 6 is a fragmentary elevation of one of the picking cylinders and showing a guard arrangement for preventing unopened bolls, leaves and trash from entering the picking cylinder housing.
Figure 2:
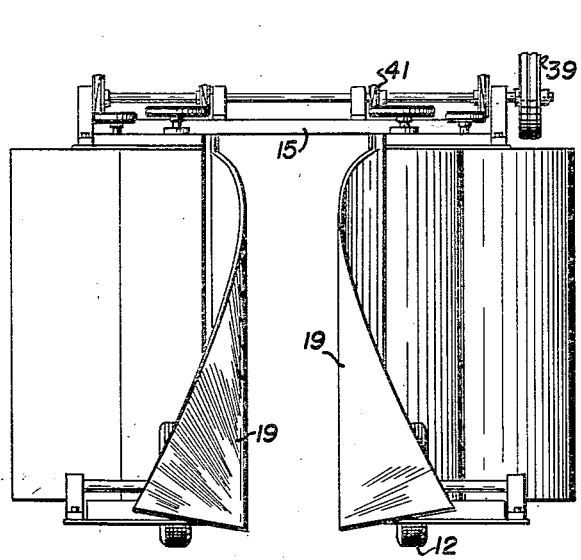
Figure 2 is a reduced front elevation of the cotton picker shown in Figure 1.
Figure 4:
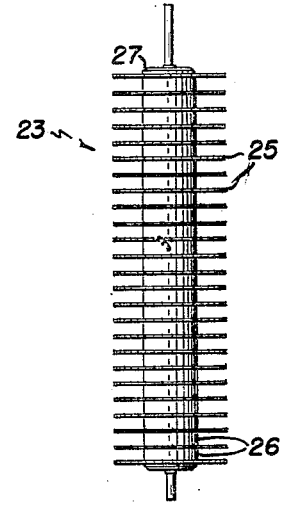
Figure 4 is a reduced elevational view of one of the picking cylinders.

The exemplary form of the invention shown in the drawings includes upper and lower forwardly projecting parallel frame members 10 and 11 for attachment to the front end of a tractor or other movable supporting means. Wheels 12 may be mounted between the lower parallel frame members 11 by means of bearings 13 rotatably engaging axles 14 on which the wheels are mounted. As shown in Figures 1 and 2, the frame construction is divided so as to provide parallel upper and lower frame members 10 and 11 on each side thereof, the upper said frame members being connected by one or more cross members 15. The upper and lower frame members 10 and 11 are further supported relative to each other by means of vertical angle members 16 and 17 and between which parallel spaced arcuate guards 18 are secured for preventing unopened bolls, leaves and trash from mixing with the cotton as the same is being picked.

Figure 5:
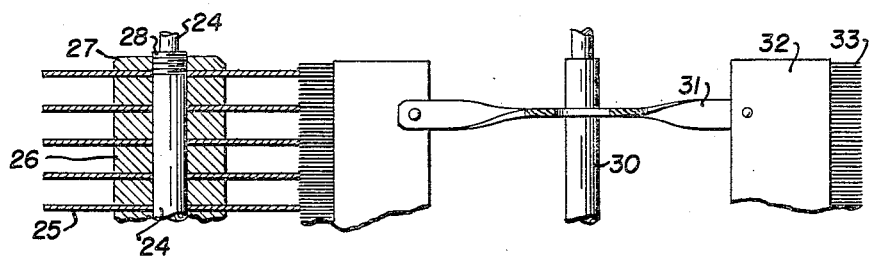
Figure 5 is an enlarged fragmentary sectional view taken approximately on line 5—5 of Figure 1 and showing contact of the brushes on one doffing cylinder with one of the picking cylinders.

Guide members 19 are mounted between the parallel sides 20 of the described frame assembly, and which guides are angularly disposed with respect to each other and forming a relatively wide V-shaped angle at the forward ends thereof, and which angle progressively approaches parallel vertical sides toward their rear ends. The purpose of the guides 19 is to lift the cotton plants 21 and position the opened bolls so that the cotton fiber will be engaged by the teeth 22 of the picking cylinders 23. There is one picking cylinder vertically mounted on each frame side 20 and arranged so that a number of the teeth 22 extend outwardly of the inner frame members 11. Each picking cylinder 23 is comprised of a vertical shaft 24, spaced disk saws 25 having cylindrical spacers 26 therebetween and holding nuts 27 on each end thereof. As shown in Figure 5, the shafts 24 are shouldered near their outer ends so as to provide for the forming of threads 28 on which the nuts 27 are engaged. As shown in Figure 1, the extending teeth 22 project through the previously described arcuate guards 18. Also shown in Figure 1, the extending teeth 22 are rearwardly directed, and which direction is the direction of saw rotation.

Doffing cylinders 29 are provided rearwardly of the picking cylinders 23 and are each comprised of a vertical shaft 30, spiders 31 secured to said shaft, and vertical blower blades 32 secured to the outer ends of said spiders. Laterally extending brushes 33 are mounted on the outer edges of the blades 32 and coact with the saw teeth 22 for removing cotton fiber from the latter. The circumferential speed of the brushes 33 is greater than the circumferential speed of the teeth for carrying out the last referred to operation. Also, the direction of rotation of each doffing cylinder 29 is opposite that of its coacting picking cylinder 23 and whereby the picked cotton is lifted from the angularly disposed saw teeth 22.

Each picking cylinder 23 is provided with an arcuate housing 34 around its outer portion, and which housing communicates with a substantially cylindrical housing 35 around each doffing cylinder 29. Rearwardly directed discharge ducts 36 are provided in the last described housings 35 for conveying the picked cotton to a cotton collecting compartment, not shown, carried by the mobile unit on which the present cotton picker is mounted.

Any suitable means may be employed for rotating the shafts 24 of the picking cylinder 23 and the shafts 30 of the doffing cylinders 29. As shown in Figures 1 and 2, a transverse shaft 37 is rotatably supported in bearings 38 mounted on the cross member 15, and which shaft is provided with a double driven pulley 39 on one end thereof. The last described pulley 39 is driven by parallel belts 40 from a source of power, and the vertical shafts 24 and 30 are driven by pulleys 41 and 42 mounted on the transverse shaft 37, which in turn are provided with belts 43 and 44 which turn pulleys 45 and 46 mounted on the upper ends of the vertical shafts 24 and 30.

In operation, the two sides 20 of the described frame assembly are moved along opposite sides of the row of cotton plants 21 to be picked. The relative speed of the saw teeth 22 removes the cotton fiber from the lifted plants, and moves the same inwardly of the guards 18 where the cotton is removed from the teeth by the action of the brushes 33. The high R. P. M. of the fan or blower blades 32 discharges the picked cotton outwardly through the ducts 36.

The invention is not limited to the embodiment herein shown and described, but may be made in many ways within the scope of the appended claims.

What is claimed is:

1. In a cotton picker, the combination of at least one pair of picking cylinders mounted on vertical axes and having their peripheries spaced from each other, a vertical shaft parallel with and spaced from the axis of each said cylinder, spiders mounted on each said shaft and spaced one above the other, vertical fan blades connected between the arms of said spiders, brushes carried by said blades and having their bristles extending outwardly beyond the outer vertical edges of said fan blades, a substantially cylindrical housing around each said vertical shaft outwardly of the ends of the bristles of said brushes, and a discharge duct in each said housing.

2. A cotton picker including parallel frames having spaced inner frame members adapted to straddle and move forwardly along a row of cotton plants, picking cylinders mounted for rotation about a vertical axis on each of said frames and extending inwardly of said inner frame members, said picking cylinders including projecting teeth defining the circumference of each said cylinder, a doffing cylinder mounted on each said frame and positioned rearwardly of the picking cylinder and mounted thereon, each said doffing cylinder being mounted for rotation about a vertical axis and including vertical blades having their outer edges equally spaced from said axis, lateral brushes mounted on said outer edges of each blade and having the extending ends thereof positioned for contact with teeth of the picking cylinder mounted on the same frame, an arcuate housing positioned partially around each picking cylinder and located forwardly and outwardly thereof, a substantially cylindrical housing around each doffing cylinder and including means communicating the same with the first said housing at a location where said brushes make contact with its coacting picking cylinder, and a discharge duct in each said housing around each said doffing cylinder, means on said frames rotating said picking cylinders, and means on said frames rotating said doffing cylinders in a direction opposite the rotation of said picking cylinders.

3. A cotton picker as defined in claim 2 and wherein each picking cylinder is comprised of a vertical shaft and spaced disk saws of the same diameter mounted thereon, and arcuate guards mounted between said saws and supported by the respective said frames, said arcuate guides being positioned inwardly of the teeth of said saws where the same extend inwardly of said inner frame members.

4. A cotton picker as defined in claim 2 and wherein each said doffing cylinder is comprised of a vertical shaft and having spiders mounted thereon, and wherein said vertical blades are mounted on said spiders and said brushes are mounted on said blades.

References Cited in the file of this patent

UNITED STATES PATENTS

| Number | Name | Date |
|---|---|---|
| 898,893 | Hollingsworth et al. | Sept. 15, 1908 |
| 1,769,254 | Campbell | July 1, 1930 |
| 2,387,004 | Berry | Oct. 16, 1945 |
| 2,473,315 | Wallace | June 14, 1949 |
| 2,484,524 | Nisbet | Oct. 11, 1949 |
| 2,509,970 | Edmonds | May 30, 1950 |
| 2,513,259 | Walker | June 27, 1950 |
| 2,644,286 | Nisbet | July 7, 1953 |